United States Patent Office 3,136,677
Patented June 9, 1964

3,136,677
METHOD OF ADHERING THE MARGINAL EDGES OF TWO FIBROUS SURFACES
Walter F. Woker, Wakefield, Mass., assignor to Jacob S. Kamborian, West Newton, Mass.
No Drawing. Filed Dec. 29, 1960, Ser. No. 79,177
5 Claims. (Cl. 156—304)

This invention relates to adhesives and more particularly to methods and materials for the rapid adhesion of leather and other fibrous materials.

Adhesives are being increasingly used in the assembly and lasting of shoes. This use places stringent requirements on adhesives applied during machine lasting since the adhesives must not only have good ultimate adhesion, but must also develop sufficient adhesion to hold the shoe parts in assembled relation in the short period of time provided in rapid production.

It has been discovered that certain modifications of polyethylene terephthalate, itself unsatisfactory, provide excellent adhesives for the lasting of shoes and for the adhesion of surfaces in general, particularly fibrous surfaces. These modifications are copolyesters composed of recurring units of the structure $$-O(CH_2)_2OOC-R-CO-$$

where R is selected from the group consisting of phenylene and alkylene radicals having from 2 to 10 carbons, and wherein in 60 to 95 percent of the units, and preferably in 85 to 95 percent of the units, R is 1,4 phenylene. Polyesters wherein, in 85 to 95 percent of the units, R is 1,4 phenylene, and wherein in the balance of the units, R is 1,3 phenylene and/or 1,2 phenylene are preferred; the most preferred adhesive of this type having 90 percent of the units with R as 1,4 phenylene, 5 percent with R as 1,3 phenylene and 5 percent with R as 1,2 phenylene.

The polyester adhesives of this invention can be provided by the ester interchange and condensation polymerization method now well established for preparing polyethylene terephthalate and related copolymers. See, for example, U.S. Patent No. 2,465,319 to Whinfield et al. Any of the known ester interchange catalysts can be employed. This method is illustrated in Example 1 below:

Example 1

A mixture of .90 mole of dimethyl terephthalate, .05 mole of dimethyl isophthalate and .05 mole of dimethyl phthalate was mixed with a 1.50 moles of ethylene glycol. The mixture was reacted for 4 to 8 hours at atmospheric pressure with cobalt acetate, 125 p.p.m. cobalt based on the total weight of the charge, as catalyst, the temperature being raised progressively from 150° C. to 225° C. Ester interchange provided the corresponding bis (2-hydroxy ethyl) esters and very low molecular weight polymers, or prepolymers, thereof with the replacement and evolution of substantially all the methanol from the dimethyl esters.

The pressure of the mixed glycol esters was then reduced to 1 mm. Hg and nitrogen bubbled through the mixture. A vacuum pump capable of maintaining 0.1 mm. Hg was run at full capacity, with sufficient nitrogen admitted to maintain 1 mm. pressure. Condensation polymerization was then conducted with agitation, the temperature being raised from 225° C. to 250° C. and held at 250° C. for six hours. Mixed polyesters of high molecular weight were formed by splitting out ethylene glycol which was distilled. The resulting polymers had a melting point between 215° C. and 230° C., an intrinsic viscosity between 0.55 and 0.65 as determined by viscosity measurements in a mixture of 60% phenol by weight and 40% tetrachloroethane, and provided excellent adhesive properties. The polymers were particularly desirable for adhering fibrous materials such as leather, paper, cloth and wood.

Further examples of polyesters useful as adhesives are given in Examples 2 to 4 below, the ester exchange and polymerization procedure being the same as in Example 1:

Example 2

| | Moles |
|---|---|
| Dimethyl terephthalate | .95 |
| Dimethyl phthalate | .05 |
| Ethylene glycol | 1.50 |

Example 3

| | |
|---|---|
| Dimethyl terephthalate | .90 |
| Dimethyl phthalate | .10 |
| Ethylene glycol | 1.50 |

Example 4

| | |
|---|---|
| Dimethyl terephthalate | .90 |
| Dimethyl isophthalate | .10 |
| Ethylene glycol | 1.50 |

Further examples of copolyesters useful as adhesives and comprising the products of copolymerization of glycol esters of dibasic alkyl acids with glycol terephthalate are given as Examples 5 and 6 below. In this examples the procedure was the same as in Example 1 excepting that the alkyl acids were added as acids and esterified directly to the glycol esters simultaneouly with the formation of glycol terephthalate by ester interchange:

Example 5

| | Moles |
|---|---|
| Dimethyl terephthalate | .85 |
| Adipic acid | .15 |
| Ethylene glycol | 1.50 |

Example 6

| | |
|---|---|
| Dimethyl terephthalate | .85 |
| Sebacic acid | .15 |
| Ethylene glycol | 1.50 |

The adhesives useful for this invention are those which have a viscosity as measured with a Brookfield viscometer at 425° F. to 500° F. of from 150 to 500 poises. The mixed phenylene polyesters of Examples 1–4 have this viscosity range at 500° F., while the mixed polyesters containing dibasic alkyl acid units have this viscosity range at 425° F. The intrinsic viscosity of these adhesive resins is between 0.55 and 0.65 as specified for Example 1.

The adhesives above provided are applied to at least one of the surfaces to be joined at a temperature of 500° F. to 525° F. and the surfaces pressed into contact. Adhesion sufficient to hold the parts in assembled relation is developed within about 15 seconds thereby permitting assembly in rapid production. The preferred mixed phthalate adhesives provide adequate adhesion for lasted shoe parts in about 5–10 seconds while the copolymers with the alkyl dibasic acids require approximately 10–15 seconds. The most preferred adhesive of Example 1 sets in about five seconds or less.

Such adhesives can be readily applied to steamed leather, if desired, since the application temperature of 500 to 525° F. readily flashes water from the surfaces to be joined.

The adhesives can be applied as a hot melt to the desired surfaces in any convenient way, either manually with a brush or gun, or by a suitable mechanical supply system. Lasting equipment with which the adhesives are useful are shown, for example, in U.S. Patents 2,701,003, 2,843,863 and 2,888,693. A toe-lasting operation wherein the present adhesives are useful is shown in the copending application, Serial No. 762,600, filed September 22, 1958, now U.S. Patent No. 3,009,182, and mechanical apparatus particularly adapted to dispense the adhesives is shown in copending application, Serial No. 68,546, filed November 10, 1960, by Alan G. Baker and Jacob S. Kamborian. The lasting method comprises, for example, tacking an insole member of fibrous material to a last or rigid form, positioning the upper on the last, applying the adhesive as a hot melt to at least one of the margins of said upper and insole, the margin of the upper being stressed relatively to the margin of the insole to stretch the upper about the last, pressing said margins together while under said relative stress, and releasing said pressure, the adhesive thereafter holding the margins in assembled relation. As illustrated in the above Patent No. 2,701,003 and also in U.S. Patent No. 2,667,908, the method is also useful for applying a cover to a cushion, panel or the like.

It should be understood that the foregoing description is for the purpose of illustration only and that the invention includes all modifications falling within the scope of the appended claims.

I claim:

1. The method of adhering the marginal edges of two fibrous surfaces which comprises:
    (a) stressing the margin of one surface relatively to the other,
    (b) applying a hot-melt adhesive to at least one of said margins,
    (c) pressing the margins of said surfaces together while said one margin is under relative stress, and
    (d) releasing said pressure within about 15 seconds after application of said adhesive to said margin, said adhesive comprising a polyester composed of recurring units of the structure

—O(CH$_2$)$_2$OOC—R—CO— wherein R is 1,4 phenylene in from sixty to ninety five percent of said units, and in the remainder of said units, R is selected from the group consisting of 1,2 phenylene, 1,3 phenylene and alkylene radicals having from two to ten carbons.

2. The method according to claim 1 wherein in 85 to 95 percent of said units, R is 1,4 phenylene.

3. The method according to claim 1 wherein said polyester is composed of recurring units of the structure

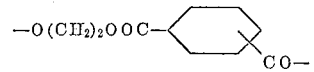

said polyester having a viscosity at 500° F. of between 150 and 500 poises.

4. The method according to claim 3 wherein in 85 to 95 percent of said units, R is 1,4 phenylene.

5. The method according to claim 3 wherein substantially 90 percent of said units have 1,4 phenylene linkages, substantially 5 percent have 1,3 phenylene linkages and the balance have 1,2 phenylene linkages.

References Cited in the file of this patent

UNITED STATES PATENTS

| | | |
|---|---|---|
| 2,437,046 | Rothrock et al. | Mar. 2, 1948 |
| 2,650,213 | Hofrichter | Aug. 25, 1953 |
| 2,961,365 | Sroog | Nov. 22, 1960 |
| 3,009,182 | Kamborian | Nov. 21, 1961 |
| 3,050,756 | Kamborian | Aug. 28, 1962 |
| 3,054,703 | Brasure | Sept. 18, 1962 |
| 3,090,772 | Crowell | May 21, 1963 |